United States Patent
Reddy et al.

(10) Patent No.: US 7,424,914 B2
(45) Date of Patent: *Sep. 16, 2008

(54) CEMENT COMPOSITIONS COMPRISING HIGH ASPECT RATIO MATERIALS AND METHODS OF USE IN SUBTERRANEAN FORMATIONS

(75) Inventors: B. Raghava Reddy, Duncan, OK (US); Gunnar Lende, Stavanger (NO); Krishna M. Ravi, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,147

(22) Filed: Nov. 9, 2006

(65) Prior Publication Data

US 2007/0051516 A1 Mar. 8, 2007

Related U.S. Application Data

(63) Continuation of application No. 10/884,756, filed on Jul. 2, 2004.

(51) Int. Cl.
*E21B 33/13* (2006.01)
(52) U.S. Cl. ...................... 166/293; 166/292
(58) Field of Classification Search ................. 166/292, 166/293
See application file for complete search history.

(56) References Cited

U.S. PATENT DOCUMENTS

| | | | |
|---|---|---|---|
| 2,463,561 A | 3/1949 | Riley | 106/99 |
| 2,738,285 A | 3/1956 | Biefeld et al. | 106/99 |
| 2,779,417 A * | 1/1957 | Clark, Jr. et al. | 166/293 |
| 2,805,719 A | 9/1957 | Anderson | 166/29 |
| 3,036,633 A | 5/1962 | Mayhew | 166/31 |
| 3,092,505 A | 6/1963 | Demaison | 106/99 |
| 3,146,828 A * | 9/1964 | Mann | 166/276 |
| 3,220,863 A | 11/1965 | Mayhew | 106/96 |
| 3,363,689 A | 1/1968 | Smith et al. | 166/29 |
| 3,736,162 A | 5/1973 | Chvalovsky et al. | 106/99 |
| 3,774,683 A | 11/1973 | Smith et al. | 166/293 |
| 3,834,916 A | 9/1974 | Kesler | 106/99 |
| 3,844,351 A * | 10/1974 | Sutton et al. | 166/293 |
| 3,852,082 A | 12/1974 | Majumdar et al. | 106/709 |
| 3,854,986 A | 12/1974 | Chvalovsky et al. | 428/391 |
| 3,861,926 A | 1/1975 | Irlam et al. | 501/38 |
| 3,861,927 A | 1/1975 | Kimura et al. | 501/38 |
| 3,904,424 A | 9/1975 | Aoki et al. | 501/38 |
| 3,953,953 A | 5/1976 | Marsden | 52/659 |
| 4,008,094 A | 2/1977 | Beall et al. | 252/62.59 |
| 4,030,939 A | 6/1977 | Mallow | 106/624 |
| 4,036,654 A | 7/1977 | Yale et al. | 501/38 |
| 4,062,913 A | 12/1977 | Miller et al. | 264/24 |
| 4,066,465 A | 1/1978 | Mohri et al. | 501/38 |
| 4,090,884 A | 5/1978 | Goeman | 106/711 |
| 4,140,533 A | 2/1979 | Ohtomo et al. | 106/50 |
| 4,142,906 A * | 3/1979 | Iizawa | 501/38 |
| 4,199,336 A | 4/1980 | Rittler | 65/2 |
| 4,224,377 A | 9/1980 | Moens | 428/369 |
| 4,240,840 A | 12/1980 | Downing et al. | 106/93 |
| 4,289,536 A | 9/1981 | Dereser | 523/217 |
| 4,304,604 A | 12/1981 | Daerr et al. | 501/38 |
| 4,341,835 A | 7/1982 | MacDowell | 428/292 |
| 4,345,037 A | 8/1982 | Fyles et al. | 501/38 |
| 4,366,255 A | 12/1982 | Lankard | 501/95 |
| 4,474,907 A | 10/1984 | Genba et al. | 523/206 |
| 4,534,796 A | 8/1985 | Massol et al. | 106/711 |
| 4,565,840 A | 1/1986 | Kobayashi et al. | 524/8 |
| 4,585,487 A | 4/1986 | Destree et al. | 106/99 |
| 4,610,926 A | 9/1986 | Tezuke | 428/399 |
| 4,689,084 A | 8/1987 | Ambroise et al. | 106/711 |
| 4,780,141 A | 10/1988 | Double et al. | 106/38.3 |
| 4,793,861 A | 12/1988 | Sohm | 524/5 |
| 4,818,288 A | 4/1989 | Aignesberger et al. | 106/90 |
| 4,835,122 A | 5/1989 | Chopinet et al. | 501/35 |
| 4,836,940 A | 6/1989 | Alexander | 507/119 |
| 4,858,487 A | 8/1989 | Mercier | 74/424.7 |
| 4,871,395 A | 10/1989 | Sugama | 106/678 |
| 4,923,517 A | 5/1990 | Rerup et al. | 524/3 |
| 4,960,649 A | 10/1990 | Takata et al. | 428/574 |
| 4,968,561 A | 11/1990 | Mizobe et al. | 428/397 |
| 4,975,396 A | 12/1990 | Thiery | 501/99 |
| 5,064,785 A | 11/1991 | Kawamoto et al. | 501/72 |
| 5,118,225 A | 6/1992 | Koch et al. | 406/144 |
| 5,154,955 A | 10/1992 | Delvaux et al. | 428/34.5 |
| 5,167,710 A | 12/1992 | Leroux et al. | 106/711 |
| 5,298,071 A | 3/1994 | Vondran | 106/757 |
| 5,339,902 A | 8/1994 | Harris et al. | 166/293 |
| 5,358,676 A | 10/1994 | Jennings et al. | 264/71 |
| 5,421,409 A | 6/1995 | Mueller et al. | 166/292 |
| 5,443,918 A | 8/1995 | Banthia et al. | 428/603 |
| 5,447,564 A | 9/1995 | Xie et al. | 106/644 |
| 5,456,752 A | 10/1995 | Hogan | 106/802 |

(Continued)

FOREIGN PATENT DOCUMENTS

EP  1 284 248 A1  2/2003

(Continued)

OTHER PUBLICATIONS

Saint-Gobain Vetrotex brochure entitled "Cem-FIL® Chopped strands 70/30" dated 2000.

(Continued)

*Primary Examiner*—Jennifer H Gay
*Assistant Examiner*—Nicole Coy
(74) *Attorney, Agent, or Firm*—Craig W. Roddy; Baker Botts, LLP.

(57) ABSTRACT

Cement compositions that include high aspect ratio materials, and methods for using such cement compositions in subterranean formations are provided herein. An example of a method is a method of cementing in a subterranean formation. An example of a composition is a cement composition for use in a subterranean formation.

11 Claims, No Drawings

U.S. PATENT DOCUMENTS

| | | | |
|---|---|---|---|
| 5,489,626 A | 2/1996 | Takaki et al. | 523/103 |
| 5,588,489 A | 12/1996 | Chatterji et al. | 166/293 |
| 5,628,822 A | 5/1997 | Hogan | 106/802 |
| 5,641,815 A | 6/1997 | Fehlmann | 521/154 |
| 5,649,568 A | 7/1997 | Allen et al. | 138/137 |
| 5,690,729 A | 11/1997 | Jones | 106/682 |
| 5,711,801 A | 1/1998 | Chatterji et al. | 106/789 |
| 5,820,670 A | 10/1998 | Chatterji et al. | 106/737 |
| 5,865,000 A | 2/1999 | Nemegeer et al. | 52/309.1 |
| 5,875,845 A | 3/1999 | Chatterji et al. | 166/293 |
| 5,897,699 A | 4/1999 | Chatterji et al. | 106/678 |
| 5,900,053 A | 5/1999 | Brothers et al. | 106/678 |
| 5,916,361 A | 6/1999 | Molloy et al. | 106/678 |
| 5,948,157 A | 9/1999 | McKenney et al. | 106/711 |
| 5,981,630 A | 11/1999 | Banthia et al. | 524/8 |
| 6,016,879 A | 1/2000 | Burts, Jr. | 175/72 |
| 6,060,535 A | 5/2000 | Villar et al. | 166/293 |
| 6,063,738 A | 5/2000 | Chatterji et al. | 507/269 |
| 6,080,234 A | 6/2000 | Clavaud et al. | 106/644 |
| 6,143,069 A | 11/2000 | Brothers et al. | 106/678 |
| 6,156,808 A | 12/2000 | Chatterji et al. | 516/116 |
| 6,220,354 B1 | 4/2001 | Chatterji et al. | 166/293 |
| 6,230,804 B1 | 5/2001 | Mueller et al. | 166/293 |
| 6,297,202 B1 | 10/2001 | Chatterji et al. | 507/261 |
| 6,308,777 B2 | 10/2001 | Chatterji et al. | 166/293 |
| 6,332,921 B1 | 12/2001 | Brothers et al. | 106/692 |
| 6,367,550 B1 | 4/2002 | Chatterji et al. | 166/293 |
| 6,457,524 B1 | 10/2002 | Roddy | 166/293 |
| 6,458,198 B1 | 10/2002 | Baret et al. | 106/644 |
| 6,488,763 B2 | 12/2002 | Brothers et al. | 106/692 |
| 6,500,252 B1 | 12/2002 | Chatterji et al. | 106/644 |
| 6,508,305 B1 | 1/2003 | Brannon et al. | 166/293 |
| 6,547,871 B2 | 4/2003 | Chatterji et al. | 106/672 |
| 6,550,362 B1 | 4/2003 | Galinat et al. | 83/23 |
| 6,582,511 B1 | 6/2003 | Velpari | 106/711 |
| 6,613,242 B2 | 9/2003 | Putt et al. | 528/312.4 |
| 6,613,424 B1 | 9/2003 | Putt et al. | 428/312.4 |
| 6,645,288 B1 | 11/2003 | Dargaud et al. | 106/696 |
| 6,647,747 B1 | 11/2003 | Brik | 65/492 |
| 6,689,208 B1 | 2/2004 | Brothers | 106/794 |
| 6,702,044 B2 | 3/2004 | Reddy et al. | 175/64 |
| 6,706,380 B2 | 3/2004 | Edwards et al. | 428/292.1 |
| 6,723,162 B1 | 4/2004 | Cheyrezy et al. | 106/644 |
| 6,729,405 B2 | 5/2004 | DiLullo et al. | 166/292 |
| 6,823,940 B2 | 11/2004 | Reddy et al. | 166/295 |
| 6,824,847 B2 | 11/2004 | Mariaggi et al. | 428/36.9 |
| 6,832,651 B2 | 12/2004 | Ravi et al. | 166/292 |
| 6,861,392 B2 | 3/2005 | Shaarpour | 507/219 |
| 6,866,712 B1 | 3/2005 | Rossi et al. | 106/489 |
| 6,962,201 B2 | 11/2005 | Brothers | 166/293 |
| 2002/0069537 A1 | 6/2002 | Wenzler et al. | 30/189 |
| 2003/0010314 A1 | 1/2003 | Brossear et al. | 123/306 |
| 2004/0040712 A1 | 3/2004 | Ravi et al. | 166/293 |
| 2004/0045713 A1 | 3/2004 | Bianchi et al. | 166/293 |
| 2004/0069537 A1 | 4/2004 | Reddy et al. | 175/72 |
| 2004/0069538 A1 | 4/2004 | Reddy et al. | 175/72 |
| 2004/0106704 A1 | 6/2004 | Meyer et al. | 524/2 |
| 2004/0108141 A1 | 6/2004 | Reddy et al. | 175/65 |
| 2004/0194960 A1 | 10/2004 | DiLullo et al. | 166/292 |
| 2004/0206501 A1 | 10/2004 | Brothers et al. | 166/292 |
| 2004/0211562 A1 | 10/2004 | Brothers et al. | 166/281 |
| 2006/0000611 A1 | 1/2006 | Reddy et al. | 166/293 |
| 2006/0174802 A1 | 8/2006 | Bedel et al. | 106/638 |
| 2006/0213664 A1 | 9/2006 | Chatterji et al. | 166/292 |

FOREIGN PATENT DOCUMENTS

| | | |
|---|---|---|
| GB | 2 392 682 A | 3/2004 |
| JP | 60016853 | 1/1985 |
| JP | 05339040 | 12/1993 |
| JP | 5339040 | 12/1993 |
| JP | 60016853 | 1/2004 |
| WO | WO 02/18291 A1 | 3/2002 |
| WO | WO 03/014040 A1 | 2/2003 |
| WO | WO 2004/022500 A2 | 3/2004 |
| WO | WO 2004/022500 A3 | 3/2004 |
| WO | WO 2004/101704 A1 | 11/2004 |
| WO | WO 2006/003389 | 1/2006 |
| WO | WO 2006/106301 | 10/2006 |

OTHER PUBLICATIONS

Saint-Gobain Vetrotex brochure entitled "Cem-FIL® Chopped strands 60/38" dated 2000.

Saint-Gobain Vetrotex brochure entitled "Cem-FIL® Chopped strands 62/2" dated 2000.

Saint-Gobain Vetrotex brochure entitled "Cem-FIL® Chopped strands 60/2" dated 2000.

Saint-Gobain Vetrotex brochure entitled "ANTI-CRAK™ High Dispersion Cem-FIL AR-chopped strands" dated 2001.

Saint-Gobain Vetrotex brochure entitled "ANTI-CRAK™ High Performance Cem-FIL AR-chopped strands" dated 2001.

Saint-Gobain Vetrotex brochure entitled "Cem-Mesh™ Cem-FIL AR-systems 120/1" dated 2001.

Fibermesh brochure entitled "Novomesh™ e3™" dated 2001.

Fibermesh brochure entitled "VertiForce™ with e3™ technology."

Fibermesh brochure entitled "STEALTH® Virgin Polypropylene Fibers Plastic Shrinkage & Plastic Settlement Crack Control" dated 2001.

Fibermesh brochure entitled "Fibermesh® INFORCE™ Virgin Polypropylene Fibrillated Fibers Plastic Shrinkage & Plastic Settlement Crack Control Concrete Toughness" dated 2001.

Fibermesh brochure entitled "e3™ Concrete Reinforcement" dated 2001.

Paper entitled "The perspectives for the future of an innovative construction material" by Dr. Klaus Holschemacher.

Nycon brochure entitled "NYCON SF".

Nycon brochure entitled "NYCONB".

Nycon brochure entitled "AR Glass Fibers".

Nycon paper entitled "Steel and Synthetic Fiber Bands" by Bob Zellers.

SI Concrete Systems brochure entitled Xorex® Steel Fiber' dated 2002.

SI Concrete Systems brochure entitled "Novotex® Steel Fiber" dated 2002.

Halliburton brochure entitled "CFR-3 Cement Friction Reducer" dated 1998.

Halliburton brochure entitled "D-AIR 3000 and D-AIR 3000L" dated 1999.

Halliburton brochure entitled Econolite Additive for Cement Slurries dated 1998.

Halliburton brochure entitled FWCA Free-Water Cement Additive dated 1999.

Halliburton brochure entitled Microblock Cement Additive dated 1999.

Halliburton brochure entitled "MicroBond Expanding Additive for Cement" dated 1999.

Halliburton brochure entitled "Pozmix® A Cement Additive" dated 1999.

Halliburton brochure entitled Spherelite Cement Additive dated 1999.

Halliburton brochure entitled "SSA-1 Strength-Stabilizing Agent" dated 1998.

Halliburton brochure entitled "ThermaLock™ Cement for Corrosive $CO_2$ Environments" dated 1999.

Paper entitled "Rock Fracture Mechanics Principles, Design and Applications" by B.N. Whitaker et al., pp. 349-371.

Paper entitled Rock Mechanics in Wellbore Construction' by Hazim Abass et al, Petroleum Well Construction, pp. 143-173.

Foreign communication from a related counterpart application dated Dec. 12, 2005.

Foreign communication from a related counterpart application dated Sep. 7, 2006.

Office action from U.S. Appl. No. 10/884,756 dated Feb. 17, 2006.

Fibermesh brochure entitled "NOVOMESH™ e3™ Blend of Steel and Synthetic Fiber" dated 2001.

Halliburton brochure entitled "Tuf Additive No. 2 Lost-Circulation Additive" date 1999.

Encyclopedia of Polymer Science and Engineering, Second Edition, vol. 6, pp. 802-839.

Nycon paper entitled "Steel and Synthetic Fiber Bands" by Bob Zellers.

SI Concrete Systems brochure entitled Xorex® Steel Fiber' dated 2002.

SI Concrete Systems brochure entitled "Novotex® Steel Fiber" dated 2002.

Halliburton brochure entitled "CFR-3 Cement Friction Reducer" dated 1998.

Halliburton brochure entitled "D-AIR 3000 and D-AIR 3000L" dated 1999.

Halliburton brochure entitled Econolite Additive for Cement Slurries dated 1998.

Halliburton brochure entitled FWCA Free-Water Cement Additive dated 1999.

Halliburton brochure entitled Microblock Cement Additive dated 1999.

Halliburton brochure entitled "MicroBond Expanding Additive for Cement" dated 1999.

Halliburton brochure entitled "Pozmix® A Cement Additive" dated 1999.

Foreign communication from a related counterpart application dated Dec. 12, 2005.

Encyclopedia of Polymer Science and Engineering, vol. 6, pp. 802-839.

Patent Application entitled "Methods of Cementing Using Cement Compositions Comprising Basalt Fibers" by Jiten Chatterji et al., filed Mar. 25, 2005, as U.S. Appl. No. 11/089,609.

U.S. Appl. No. 11/089,609, filed Mar. 25, 2005, Chatterji et al.

Sudaglass Fiber Technology brochure entitled "Cut Fibers That Fill the Bill", Nov. 7, 2005.

Sudaglass Fiber Technology brochure entitled "Basalt-Based Fiber Technology", Nov. 7, 2005.

Office Action from U.S. Appl. No. 11/272,951, Jan. 24, 2007.

Office Action from U.S. Appl. No. 11/101,762, May 24, 2007.

Foreign communication from a related application, Jun. 28, 2006.

Office Action from U.S. Appl. No. 11/272,951, Aug. 6, 2007.

Material Safety Data Sheet for AR continuous filaments glass fibers, Jun. 2007.

Cem-FIL® Fibers Product Details, Jun. 12, 2000.

Office Action dated Feb. 2, 2007 from U.S. Appl. No. 11/272,951.

Office Action dated Mar. 28, 2006, from U.S. Appl. No. 11/101,762.

Office Action dated Sep. 13, 2006, from U.S. Appl. No. 11/101,762.

Office Action dated Jan. 24, 2007, from U.S. Appl. No. 11/101,762.

* cited by examiner

CEMENT COMPOSITIONS COMPRISING HIGH ASPECT RATIO MATERIALS AND METHODS OF USE IN SUBTERRANEAN FORMATIONS

CROSS-REFERENCE TO RELATED APPLICATION

This application is a continuation of U.S. patent application Ser. No. 10/884,756, filed Jul. 2, 2004, entitled "Cement Compositions Comprising High Aspect Ratio Materials And Methods Of Use In Subterranean Formations," by B. Raghava Reddy, et al., which is incorporated by reference herein for all purposes, from which priority is claimed pursuant to 35 U.S.C. § 120.

BACKGROUND OF THE INVENTION

The present invention relates to subterranean well cementing operations, and more particularly, to cement compositions comprising high aspect ratio materials and methods for using such cement compositions in subterranean formations.

Hydraulic cement compositions commonly are utilized in subterranean operations, particularly subterranean well completion and remedial operations. For example, hydraulic cement compositions are used in primary cementing operations whereby pipe strings, such as casing and liners, are cemented in well bores. In performing primary cementing, a hydraulic cement composition is pumped into an annular space between the walls of a well bore and the exterior surface of the pipe string disposed therein. The cement composition sets in the annular space, thereby forming therein an annular sheath of hardened, substantially impermeable cement that supports and positions the pipe string in the well bore and bonds the exterior surface of the pipe string to the walls of the well bore. Hydraulic cement compositions also are used in remedial cementing operations, such as plugging highly permeable zones or fractures in well bores, plugging cracks and holes in pipe strings, and the like.

Once set, the cement sheath may be subjected to a variety of shear, tensile, impact, flexural, and compressive stresses that may lead to failure of the cement sheath, resulting in, inter alia, fractures, cracks, and/or debonding of the cement sheath from the pipe string and/or the formation. This can lead to undesirable consequences including, inter alia, lost production, environmental pollution, hazardous rig operations resulting from unexpected fluid flow from the formation caused by the loss of zonal isolation, and/or hazardous production operations. Cement failures may be particularly problematic in high temperature wells, where fluids injected into the wells or produced from the wells by way of the well bore may cause the temperature of any fluids trapped within the annulus to increase. Furthermore, high fluid pressures and/or temperatures inside the pipe string may cause additional problems during testing, perforation, fluid injection, and/or fluid production. If the pressure and/or temperature inside the pipe string increases, the pipe may expand and stress the surrounding cement sheath. This may cause the cement sheath to crack, or the bond between the outside surface of the pipe string and the cement sheath to fail, thereby breaking the hydraulic seal between the two. Furthermore, high temperature differentials created during production or injection of high temperature fluids through the well bore may cause fluids trapped in the cement sheath to thermally expand, causing high pressures within the sheath itself. Additionally, failure of the cement sheath also may be caused by, inter alia, forces exerted by shifts in subterranean formations surrounding the well bore, cement erosion, and repeated impacts from the drill bit and the drill pipe.

SUMMARY OF THE INVENTION

The present invention relates to subterranean well cementing operations, and more particularly, to cement compositions comprising high aspect ratio materials and methods for using such cement compositions in subterranean formations.

One example of a method of the present invention is a method of cementing in a subterranean formation, comprising providing a cement composition comprising water, cement, and a high aspect ratio material selected from glass fibers and non-fibrous minerals; introducing the cement composition into a subterranean formation; and allowing the cement composition to set therein.

Another example of a method of the present invention is a method of cementing in a subterranean formation, comprising: providing a cement composition comprising water, cement, and glass fibers having a mean aspect ratio in the range of from about 1.25 to about 5,000; introducing the cement composition into a subterranean formation; and allowing the cement composition to set therein.

Another example of a method of the present invention is a method of cementing in a subterranean formation, comprising: providing a cement composition comprising water, cement, and a non-fibrous mineral having a mean aspect ratio of at least about 50; introducing the cement composition into a subterranean formation; and allowing the cement composition to set therein.

The features and advantages of the present invention will be readily apparent to those skilled in the art upon a reading of the description of the preferred embodiments that follows.

DESCRIPTION OF PREFERRED EMBODIMENTS

The present invention relates to subterranean well cementing operations, and more particularly, to cement compositions comprising high aspect ratio materials and methods for using such cement compositions in subterranean formations.

Certain embodiments of the cement compositions of the present invention comprise cement, water, and a high aspect ratio material that comprises non-amorphous metallic fibers, alkali-resistant glass fibers, non-fibrous minerals, or a mixture thereof. As referred to herein, the term "aspect ratio" will be understood to mean the ratio of a solid body's length to its width.

Any cement suitable for use in subterranean cementing operations may be used in accordance with the present invention. In one embodiment, the improved cement compositions of the present invention comprise a hydraulic cement. A variety of hydraulic cements are suitable for use, including those comprising calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof. In certain embodiments, the cement compositions of the present invention may comprise a Portland cement. In certain embodiments, the Portland cement may be chosen from those classified as Class A, C, G, and H cements according to *API Specification for Materials and Testing for Well Cements*, API Specification 10, Fifth Ed., Jul. 1, 1990. Another cement that may be useful in certain embodiments of the present invention is commercially available under the trade name "THER- MALOCK™" from Halliburton Energy Services, Inc., of Duncan, Okla. Other cements that may be suitable for use in accordance with the present invention include, inter alia, low-density cements. Such low-density cements may be, inter alia, foamed cements or cements comprising another means to reduce their density, such as hollow microspheres, low-density elastic beads, fly ashes, blast furnace slag, or other density-reducing additives known in the art.

Generally, the water utilized in the cement compositions of the present invention may be fresh water, salt water (e.g., water containing one or more salts dissolved therein), brine (e.g., saturated salt water), or seawater. This water may be from any source, provided that the water does not contain an excess of compounds (e.g., dissolved organics) that may adversely affect other components in the cement composition. In some embodiments, the water may be present in the cement compositions of the present invention in an amount sufficient to form a pumpable slurry. In certain embodiments, the water is present in the cement compositions of the present invention in an amount in the range of from about 30% to about 180% by weight of cement ("bwoc") therein. In certain embodiments, the water is present in the cement compositions of the present invention in an amount in the range of from about 40% to about 50% bwoc therein. One of ordinary skill in the art, with the benefit of this disclosure, will recognize the appropriate amount of water for a chosen application.

The cement compositions of the present invention also comprise a high aspect ratio material that comprises non-amorphous (e.g., crystalline) metallic fibers, alkali-resistant glass fibers, non-fibrous minerals, or a mixture thereof. In certain embodiments, the non-amorphous metallic fibers may be obtained by cold drawing low-carbon steel wires (e.g., steel wool). Suitable metallic fibers include, but are not limited to, chopped steel fibers, stainless steel fibers, brass fibers, bronze fibers, nickel fibers, and titanium fibers. In certain embodiments of the present invention, the non-amorphous metallic fibers are low-carbon chopped steel wool fibers. Examples of suitable metallic fibers include, inter alia, those that are commercially available from Global Material Technologies, of Palatine, Ill., under the trade names "GMT-2136," "GMT-180," and "GMT-380." In certain embodiments wherein steel fibers are used, the steel fibers may comprise carbon present in an amount in the range of from about 0.06% to about 0.11% by weight. In certain embodiments of the present invention wherein the high aspect ratio material comprises non-amorphous metallic fibers, the non-amorphous metallic fibers generally have a mean diameter in the range of from about 0.025 millimeters to about 0.10 millimeters, and a mean length in the range of from about 0.1 millimeter to about 10 millimeters. As will be appreciated by one of ordinary skill in the art, with the benefit of this disclosure, the length and diameter of the non-amorphous metallic fibers may be adjusted to enhance properties such as their flexibility and ease of dispersion in the cement compositions of the present invention. In certain embodiments of the present invention wherein the high aspect ratio material comprises non-amorphous metallic fibers, the non-amorphous metallic fibers generally have an aspect ratio in the range of from about 1.25 to about 400. In certain embodiments, the non-amorphous metallic fibers may have an aspect ratio in the range of from about 15 to about 200, and in certain other embodiments, from about 25 to about 100. In certain embodiments of the present invention wherein the high aspect ratio material comprises non-amorphous metallic fibers, the metallic fibers may be present in the cement compositions of the present invention in an amount in the range of from about 0.5% to about 10% bwoc. Due to their density, certain metallic fibers may exhibit a propensity to settle out of the cement compositions of the present invention. Therefore, certain embodiments of the cement compositions of the present invention that comprise non-amorphous metallic fibers also may comprise a settling-prevention additive, such as a viscosifier, that may eliminate, or at least reduce, settling. Suitable settling-prevention additives include, inter alia, hydroxyethylcellulose, and xanthan gum. A suitable settling-prevention additive is commercially available from Halliburton Energy Services, Inc., under the trade name "FWCA." Where settling-prevention additives are included in the cement composition, they should be present in the cement composition in an amount that facilitates a uniform density throughout the cement composition.

In certain embodiments, the non-amorphous metallic fibers may be coated by, e.g., surfactants that may inhibit any reaction that may occur between the cement composition and the metallic fibers. Examples of suitable surfactants that may be used to coat the non-amorphous metallic fibers include, inter alia, hydrophobic organic materials such as sorbitol mono-oleate, sorbitol tri-oleate, and the like. Sorbitol mono-oleate is commercially available from Aldrich Chemical Company, of Milwaukee, Wis., under the trade name "SPAN 80," while sorbitol tri-oleate is commercially available from Aldrich Chemical Company under the trade name "SPAN 85." In certain embodiments of the present invention wherein the non-amorphous metallic fibers are coated, the coating may be present on the non-amorphous metallic fibers in an amount in the range of from about 0.5% to about 5% by weight of the fibers.

In certain embodiments, the high aspect ratio materials present in the cement compositions of the present invention may comprise glass fibers. In certain embodiments, the glass fibers are alkali-resistant (AR) glass fibers, although non-AR glass fibers also may be used in certain embodiments of the present invention. In certain embodiments of the present invention where non-AR glass fibers are used, the non-AR glass fibers may be made alkali-resistant through the application of a coating with an acrylic acid-based polymer, as will be understood by one of ordinary skill in the art, with the benefit of this disclosure. In certain embodiments wherein the cement compositions of the present invention comprise an alkaline cement, and the high aspect ratio materials comprise glass fibers, AR glass fibers may be particularly suitable. However, when prepared using larger portions of pozzolanic or latent-hydraulic cement additives (e.g., coal, fly ash, or silica dust), or high aluminate cements, certain embodiments of the cement compositions of the present invention may have lower pH values, which may facilitate the use of non-AR glass fibers. One of ordinary skill in the art, with the benefit of this disclosure, will recognize the amounts and mixtures of AR and non-AR resistant glass fibers to use depending on the alkalinity of the cement being used. In certain embodiments, the AR glass fibers may comprise zirconium oxide in an amount in the range of from about 0.01% to about 15% by weight; in certain other embodiments, the AR glass fibers may comprise zirconium oxide in an amount in the range of from about 10% to about 15% by weight. In certain embodiments of the present invention, the glass fibers have a length in the range of from 0.5 to about 13 millimeters, and a diameter in the range of from about 10 to about 400 microns. In certain embodiments, the glass fibers may have an aspect ratio in the range of from about 1.25 to about 5,000. In certain embodiments, the glass fibers may have an aspect ratio in the range of from about 10 to about 1,000, and in certain other embodiments, from about 20 to about 500. Examples of suitable glass fibers include, inter alia, "CEM-FIL® HD"

chopped strands and "CEM-FIL® HP" chopped strands, available from Saint-Gobain Vetrotex America, Inc., of Valley Forge, Pa. Other examples of suitable glass fibers include, inter alia, "E" grade "FIBERGLAST," available from Fiberglast Development Corp., of Brookville, Ohio, and "NYCON AR" grade fibers from Nycon, Inc., of Westerly, R.I. When included in the cement compositions of the present invention, the glass fibers may be present in an amount in the range of from about 0.5% to about 20% bwoc.

In certain embodiments, the high aspect ratio materials present in the cement compositions of the present invention may comprise non-fibrous minerals. Generally, suitable non-fibrous minerals may have a layered, or a platy, structure. The aspect ratio of suitable non-fibrous minerals may be determined as a ratio of the length of the non-fibrous mineral to its width. Examples of suitable non-fibrous minerals include, but are not limited to, micas and vermiculites. In certain embodiments wherein mica is included in the cement compositions of the present invention, suitable micas include, but are not limited to, phlogopites (e.g., potassium magnesium aluminosilicates), biotites, lepidolites, and muscovites (e.g., potassium aluminum silicates). Mica materials employed in the present invention may have an aspect ratio in the range of from about 50 to about 250. Examples of commercially available mica materials include, but are not limited to, "MICA 5200," "MICA 5900," and "MICA 6060," available from Polar Minerals, Inc., in Mt. Vernon, Ind.

Optionally, certain embodiments of the cement compositions of the present invention also may include solid materials that may strengthen and reinforce the cement. These solid materials may include both natural and man-made materials, and may have any shape, including, but not limited to, beaded, cubic, bar-shaped, flake, fiber, platelets, cylindrical, or mixtures thereof. Suitable such solid materials include, but are not limited to, Wollastonite ($CaOSiO_2$), basalts, carbon fibers, plastic fibers (e.g., polypropylene and polyacrylic nitrile fibers), and combinations thereof. In certain embodiments wherein Wollastonite is employed in the present invention, the Wollastonite may have an aspect ratio in the range of from about 11 to about 19 and a mean particle size in the range of from about 4 to about 40 microns. In certain embodiments wherein basalt is used in the cement composition of the present invention, the basalt may have a mean particle size in the range of from about 3 mm to about 6 mm, and an aspect ratio in the range of from about 130 to about 660. Where included, these additional solid materials may be added to the cement composition of the present invention individually or in combination. Additionally, the solid materials of the present invention may be present in the cement composition in a variety of lengths and aspect ratios. One of ordinary skill in the art, with the benefit of this disclosure, will recognize the mixtures of type, length, and aspect ratio to use to achieve the desired properties of a cement composition for a particular application.

Optionally, additional additives may be added to the cement compositions of the present invention as deemed appropriate by one skilled in the art with the benefit of this disclosure. Examples of such additives include, inter alia, fly ash, silica compounds, fluid loss control additives, lost circulation materials, a surfactant, a dispersant, an accelerator, a retarder, a salt, a formation conditioning agent, fumed silica, bentonite, microspheres, expanding additives, weighting materials, organic fibers, and the like. For example, the cement compositions of the present invention may be foamed cement compositions comprising an expanding additive that produces gas within the cement composition in order, inter alia, to reduce the cement composition's density. An example of a suitable expanding additive comprises a blend containing gypsum, and is commercially available under the trade name "MICROBOND" from Halliburton Energy Services, Inc., at various locations. One of ordinary skill in the art with the benefit of this disclosure will recognize the proper amount of an expanding additive to use in order to provide a foamed cement composition having a desired density. An example of a suitable sodium silicate is commercially available from Halliburton Energy Services, Inc., under the trade name ECONOLITE®. An example of a suitable additive that demonstrates free-water-reduction and solids-suspension properties is commercially available from Halliburton Energy Services, Inc., of Duncan, Okla., under the trade name "FWCA™." An example of a suitable dispersant is commercially available from Halliburton Energy Services, Inc., under the trade name "CFR-3." An example of a suitable fly ash is an ASTM class F fly ash that is commercially available from Halliburton Energy Services, Inc., under the trade name "POZMIX® A." An example of a suitable silica flour is commercially available from Halliburton Energy Services, Inc., under the trade name "SSA-1." An example of a suitable fumed silica is an aqueous suspension of fumed silica that is commercially available from Halliburton Energy Services, Inc., under the trade name "MICROBLOCK." An example of a suitable foaming surfactant is commercially available from Halliburton Energy Services, Inc., under the trade name "ZONESEAL 3000." An example of a suitable defoamer is commercially available from Halliburton Energy Services, Inc., under the trade name "D-AIR 3000L."

An example of a method of the present invention is a method of cementing in a subterranean formation, comprising: providing a cement composition comprising water, cement, and non-amorphous metallic fibers having a mean aspect ratio in the range of from about 1.25 to about 400; introducing the cement composition into a subterranean formation; and allowing the cement composition to set therein.

Another example of a method of the present invention is a method of cementing in a subterranean formation, comprising: providing a cement composition comprising water, cement, and glass fibers having a mean aspect ratio in the range of from about 1.25 to about 5,000; introducing the cement composition into a subterranean formation; and allowing the cement composition to set therein.

Another example of a method of the present invention is a method of cementing in a subterranean formation, comprising: providing a cement composition comprising water, cement, and a non-fibrous mineral having a mean aspect ratio of at least about 50; introducing the cement composition into a subterranean formation; and allowing the cement composition to set therein.

To facilitate a better understanding of the present invention, the following examples of preferred embodiments are given. In no way should such examples be read to limit, or to define, the scope of the invention.

EXAMPLE 1

Sample cement compositions were prepared by mixing a base cement slurry with various amounts and grades of chopped steel wool fibers. The base cement slurry comprised Class H cement, 39.42% bwoc water, and 0.25% bwoc FWCA™, and was prepared according to API Recommended Practice 10B, Twenty-Second Edition, December 1997. After the addition of the chopped steel wool fibers, the samples were stirred at 1,000-2,000 rpm for about 2 minutes, then cured at 190° F. for 72 hours at 3000 psi.

Sample Composition No. 1 comprised the base cement slurry, with no fibers.

Sample Composition No. 2 comprised the base cement slurry mixed with 1% GMT-2136 Grade 0 chopped steel wool fibers bwoc.

Sample Composition No. 3 comprised the base cement slurry mixed with 5% GMT-2136 Grade 0 chopped steel wool fibers bwoc.

Sample Composition No. 4 comprised the base cement slurry mixed with 1% GMT-180 Grade 1 chopped steel wool fibers bwoc.

Sample Composition No. 5 comprised the base cement slurry mixed with 3% GMT-180 Grade 1 chopped steel wool fibers bwoc.

Sample Composition No. 6 comprised the base cement slurry mixed with 5% GMT-180 Grade 1 chopped steel wool fibers bwoc.

The compressive and tensile strengths exhibited by the sample cement compositions are summarized in Table 1, below. The Brazilian Tensile Strength Test was performed according to ASTM C496, and used dog-bone-shaped briquettes according to the procedure described for test CRD-C 260-01 in the U.S. Army Corps of Engineers' Handbook for Concrete and Cement.

TABLE 1

| Sample Composition | Design Density (lb/gal) | Density of top set cement (lb/gal) | Density of middle set cement (lb/gal) | Density of bottom set cement (lb/gal) | Compressive Strength (psi) | Brazilian Tensile Strength (psi) |
|---|---|---|---|---|---|---|
| Sample Composition No. 1 | 16.4 | 16.4 | 16.4 | 16.4 | 4340 | 430 |
| Sample Composition No. 2 | 16.48 | 16.65 | 16.7 | 16.75 | 3400 | 500 |
| Sample Composition No. 3 | 16.82 | 16.96 | 17.06 | 17.09 | 3800 | 540 |
| Sample Composition No. 4 | 16.48 | 16.64 | 16.72 | 16.74 | 3320 | 400 |
| Sample Composition No. 5 | 16.65 | 16.87 | 16.93 | 16.96 | 3250 | 490 |
| Sample Composition No. 6 | 16.82 | 16.96 | 17.06 | 17.1 | 3820 | 460 |

Example 1 demonstrates, inter alia, that the cement compositions of the present invention comprising fibers having high aspect ratios are suitable for use in subterranean formations.

EXAMPLE 2

A base cement slurry was prepared according to API Recommended Practice 10B, Twenty-Second Edition, December 1997, that comprised Class H cement and 37.34% water-bwoc, and that had a density of 16.74 lb/gal. Samples were cured at 190° F. and 3000 psi for 72 hours.

Sample Composition No. 7 comprised the base cement slurry, with no glass fibers.

Sample Composition No. 8 comprised the base cement slurry mixed with 0.75% CEM-FIL® HD AR bwoc using API mixing procedures.

Sample Composition No. 9 comprised the base cement slurry mixed by hand with 0.75% CEM-FIL® HD bwoc.

Sample Composition No. 10 comprised the base cement slurry mixed by hand with 1.5% CEM-FIL® HD bwoc.

Sample Composition No. 11 comprised the base cement slurry mixed with 0.75% FiberGlast 29 bwoc using API mixing procedures.

Sample Composition No. 12 comprised the base cement slurry mixed with 1.5% FiberGlast 29 bwoc using API mixing procedures.

Sample Composition No. 13 comprised the base cement slurry mixed with 0.75% FiberGlast 38 bwoc using API mixing procedures.

The compressive and tensile strengths exhibited by the sample compositions are summarized in Table 2, below.

TABLE 2

| Sample Composition | Compressive Strength (psi) | Tensile Strength (psi) |
|---|---|---|
| Sample Composition No. 7 | 5380 | 522 |
| Sample Composition No. 8 | 4746 | 470 |
| Sample Composition No. 9 | 4642 | 560 |
| Sample Composition No. 10 | 6060 | 650 |
| Sample Composition No. 11 | 6042 | 712 |
| Sample Composition No. 12 | 6445 | 642 |
| Sample Composition No. 13 | 6190 | 660 |

Example 2 demonstrates, inter alia, that the sample compositions comprising glass fibers exhibited compressive and tensile strengths comparable to, or significantly better than those exhibited by the base cement slurry. Furthermore, both AR and non-AR glass fibers had beneficial effects on the strength of the sample cement compositions.

EXAMPLE 3

Sample cement compositions were prepared according to the following procedure: Class G cement and silica flour (SSA-1) were added to a mixture of seawater and calcium chloride solution according to API Recommended Practice 10B, Twenty-Second Edition, December 1997. The composition then was transferred to a foam blender, and the foaming surfactant ZONESEAL 3000 was added, in varying amounts. The composition was stirred at high speed for 15-30 seconds, while foaming was completed. For certain compositions comprising glass fibers, the glass fibers were hand mixed into the composition with a spatula. Tensile strengths of the cured cement compositions were measured according to CRD-C 260-01.

Sample Composition No. 14 comprised Class G cement, 49.45% seawater bwoc, 35% SSA-1 bwoc, 2.5% ZONESEAL 3000 by weight of the water, 0.49 gal/sack 33% $CaCl_2$ solution, and no glass fibers.

Sample Composition No. 15 comprised Class G cement, 49.45% seawater bwoc, 35% bwoc SSA-1, 2.5% ZONESEAL 3000 by weight of the water, 0.49 gallons/sack 33% $CaCl_2$ solution, and 14.35% CEM-FIL® HP glass fibers by volume of the foamed slurry.

Sample Composition No. 16 comprised Class G cement, 49.45% seawater bwoc, 35% bwoc SSA-1, 2.5% ZONESEAL 3000 by weight of the water, 0.49 gallons/sack 33% $CaCl_2$ solution, and 28.67% CEM-FIL® HP glass fibers by volume of the foamed slurry.

Sample Composition No. 17 comprised Class G cement, 49.45% seawater bwoc, 35% SSA-1 bwoc, 1.5% ZONESEAL 3000 by weight of the water, 0.65 gallons/sack 33% $CaCl_2$ solution, and 14.35% CEM-FIL® HP glass fibers by volume of the foamed slurry.

Sample Composition No. 18 comprised Class G cement, 129.66% seawater bwoc, 22.5% SSA-1 bwoc, 2.02 gallons/sack MICROBLOCK, 0.23 gallons/sack ECONOLITE®, and no glass fibers.

Sample Composition No. 19 comprised Class G cement, 129.66% seawater bwoc, 22.5% SSA-1 bwoc, 2.02 gallons/sack MICROBLOCK, 0.23 gallons/sack ECONOLITE, and 30% CEM-FIL® HP glass fibers by volume of the cement slurry.

Sample Composition No. 20 comprised Class G cement, 129.66% seawater bwoc, 22.5% SSA-1 bwoc, 2.02 gallons/sack MICROBLOCK, 0.46 gallons/sack ECONOLITE, and 30% CEM-FIL® HP glass fibers by volume of the cement slurry.

The sample compositions were cured under a variety of curing conditions, set forth below.

Curing Condition A consisted of curing at room temperature for 2-3 days, followed by curing at 60° C. in a water bath for 3 days.

Curing Condition B consisted of curing at room temperature for 2-3 days, followed by curing at 160° C. and 3000 psi for 3 days.

Curing Condition C consisted of curing at room temperature for 2-3 days, followed by curing at 130° C. and 3000 psi for 3 days.

Curing Condition D consisted of curing at room temperature for 2-3 days, followed by curing at 120° C. and 3000 psi for 3 days.

Curing Condition E consisted of curing at room temperature for 2-3 days, followed by curing at 110° C. and 3000 psi for 3 days.

The tensile strengths exhibited by the sample compositions after curing under the various curing conditions are summarized in Table 3, below.

TABLE 3

| Sample Composition | Curing Conditions | Unfoamed Slurry Density (lb/gal) | Foamed Slurry Density (lb/gal) | Tensile Strength (psi) |
|---|---|---|---|---|
| Sample Composition No. 14 | A | 16.3 | 13.0 | 160 |
| Sample Composition No. 14 | B | 16.3 | 13.0 | 427 |
| Sample Composition No. 15 | A | 16.3 | 13.0 | 364 |
| Sample Composition No. 15 | B | 16.3 | 13.0 | 326 |
| Sample Composition No. 16 | A | 16.3 | 13.8 | 306 |
| Sample Composition No. 16 | C | 16.3 | 13.8 | 398 |
| Sample Composition No. 17 | A | 14.8 | 12.5 | 220 |
| Sample Composition No. 17 | B | 14.8 | 12.5 | 219 |
| Sample Composition No. 18 | A | 12.5 | N.A. | 112 |
| Sample Composition No. 18 | B | 12.5 | N.A. | 81 |
| Sample Composition No. 19 | A | 12.5 | N.A. | 191 |
| Sample Composition No. 19 | C | 12.5 | N.A. | 169 |
| Sample Composition No. 20 | C | 12.5 | N.A. | 138 |
| Sample Composition No. 20 | D | 12.5 | N.A. | 220 |
| Sample Composition No. 20 | E | 12.5 | N.A. | 245 |

As shown in Table 3, the inclusion of AR glass fibers improved the tensile strengths of both foamed and unfoamed cement compositions.

EXAMPLE 4

Impact strength tests were performed on sample cement compositions that comprised Class H cement, 39.4% water bwoc, and 0.25% FWCA™ bwoc. Fibers were added to certain cement compositions, between 500-2000 rpm, after the cement compositions had been prepared according to API Recommended Practice 10B, Twenty-Second Edition, December 1997. For certain compositions, the fibers were coated with a surfactant (sorbitol mono-oleate mixed with isopropyl alcohol ("IPA") in a 1:1 weight ratio). The IPA-sorbitol mono-oleate mixture then was applied to certain of the fibers in an amount sufficient to coat the fibers with a net weight of 0.5%, 1.5%, or 3.0% of sorbitol mono-oleate. The coated fibers were agitated by tumbling overnight, and the IPA was allowed to evaporate in a lab hood. The sample cement compositions were cured either in a water bath at 190° for 72 hours ("Method A") or in an autoclave at 190° F. for 72 hours under 3000 psi ("Method B"). Compressive strengths were measured according to API Recommended Practice 10B. Tensile strengths were measured according to CRD-C 260-01.

Impact strength tests were performed with a Gardner Impact Tester, Model #5510, manufactured by Paul N. Gardner Co. Inc., of Lauderdale-by-the-sea, Florida. The dropping weight comprised a 2 pound metal cylinder having a ball diameter of 0.5%. A procedure was developed that provided for differentiation of sample compositions having different impact strengths. First, the sample cement compositions were poured with 2"×2"×2" brass molds, and cured by either Method A or Method B above. Once removed from the mold, the cured sample cement compositions were submerged in water until testing.

The smooth side of the cured sample cement composition was placed on the dye plate of the impact tester. While the cured cement composition was held in place, the dropping weight was raised to a height of about 15 inches in the guide tube, then allowed to fall freely. If the cured sample cement composition did not split into separate pieces, the dropping weight was raised again and allowed to drop on the scope impact spot as before. If the cured sample cement composition remained unbroken after 9 impacts, the height from which the dropping weight was to be dropped was increased to 20 inches. The process was repeated, and if the cured sample cement composition survived 9 impacts from 20 inches, the drop height then was increased to 30 inches, and the process agent was repeated.

The results of the testing are set forth in the table below.

In Table 4, "N.D." indicates that the tensile strength of a particular sample composition was not determined.

Example 4 demonstrates, inter alia, that cement compositions of the present invention comprising steel wool fibers possess desirable impact strengths, and that the application of a coating to the steel wool fibers may further increase the impact strength of a cement composition.

EXAMPLE 5

A variety of sample cement compositions were prepared as follows.

Sample Composition No. 29 was prepared according to API Recommended Practice 10B, Twenty-Second Edition, December 1997, by mixing 56% Class H cement bwoc, 22% POZMIX® A bwoc, 22% fumed silica bwoc, and 2% bwoc bentonite. This mixture then was added to 112.6% bwoc water and 0.125 gallons of D-AIR 300L per sack of Class H cement.

Sample Composition No. 30 was prepared similarly to Sample Composition No. 29, except that 1% carbon fibers were added to the solid mixture of cement, POZMIX® A, fumed silica, and bentonite. The carbon fibers were supplied by Halliburton Energy Services, Inc., under the trade name "FDP C684-03." After the addition of the carbon fibers to the solid mixture, and after the addition of water and D-AIR 3000L, 1% CEM-FIL HD AR grade glass fibers bwoc were hand mixed into the composition.

Sample Composition No. 31 was prepared similarly to Sample Composition No. 30, except that the CEM-FIL HD AR grade glass fibers were added in the cement of 2% bwoc.

Sample Composition No. 32 were prepared similarly to Sample Composition No. 31, except that the CEM-FIL HD AR grade glass fibers were added in the cement of 4% bwoc.

The compressive strength and tensile strengths of the cement compositions were measured according to the procedures described earlier, and are set forth in the table below.

TABLE 4

| Sample Composition | Steel Wool Fibers | Fiber Concentration | Surfactant Concentration | Slurry Density | Curing Method | Impacts From 15" | Impacts From 20" | Impacts From 30" | Compressive Strength (psi) | Tensile Strength (psi) |
|---|---|---|---|---|---|---|---|---|---|---|
| Sample Composition No. 21 | None | None | None | 16.4 | B | 1 | 0 | 0 | 4340 | 430 |
| Sample Composition No. 22 | GMT-2136 | 3% bwoc | None | 16.65 | A | 5.5 | 0 | 0 | 3050 | 400 |
| Sample Composition No. 23 | GMT-180 | 3% bwoc | None | 16.65 | A | 5 | 0 | 0 | 3190 | 370 |
| Sample Composition No. 24 | GMT-380 | 3% bwoc | None | 16.65 | A | 5 | 0 | 0 | 3010 | 410 |
| Sample Composition No. 25 | GMT-180 | 3% bwoc | None | 16.65 | B | 9 | 5 | 0 | 3670 | N.D. |
| Sample Composition No. 26 | GMT-180 | 3% bwoc | 0.5% by weight of fiber | 16.65 | B | 9 | 9 | 1 | 4020 | N.D. |
| Sample Composition No. 27 | GMT-180 | 3% bwoc | 1.5% by weight of fiber | 16.65 | B | 9 | 9 | 3 | 3880 | N.D. |
| Sample Composition No. 28 | GMT-180 | 3% bwoc | 3% by weight of fiber | 16.65 | B | One drop from a height of 40 inches | | | 3430 | N.D. |

TABLE 5

| Sample Composition | Compressive Strength (psi) | Tensile Strength (psi) |
|---|---|---|
| Sample Composition No. 29 | 1210 | 90 |
| Sample Composition No. 30 | 1470 | 260 |
| Sample Composition No. 31 | 1570 | 170 |
| Sample Composition No. 32 | 1300 | 175 |

Example 5 demonstrates, inter alia, that the cement compositions of the present invention comprising a mixture of carbon fibers and glass fibers possess desirable compression strengths and tensile strengths.

EXAMPLE 6

Sample cement compositions were prepared comprising Class H cement, 15% fumed silica bwoc, 25% POZMIX® A bwoc, 1% CFR-3 bwoc, and 0.05 gallons D-AIR 3 per sack of Class H cement. The sample cement compositions further comprised glass spheres commercially available from 3M Corporation of St. Paul, Minn., under the trade name SCOTCHLITE K46, in differing amounts. Mica was added to some of the sample compositions. The sample composition further comprised different amounts of water.

The curing conditions of each sample composition, along with certain mechanical properties, are set forth in the table below. Where performed, the compressive strength and tensile strength of the cement compositions were carried out according to the testing procedures previously described.

TABLE 6

| Sample Composition | Mica Name | Particle Size, microns | Aspect Ratio | % Mica bwoc | Beads % bwoc | Water % bwoc | Density ppg | Curing Conditions | Tensile Strength, psi | Comp. Str. psi |
|---|---|---|---|---|---|---|---|---|---|---|
| Sample Composition No. 33 | None | N.A. | N.A. | N.A. | 22 | 55.6 | 12 | 100° F., 72 hrs, 3000 psi | 130 | N.D. |
| Sample Composition No. 34 | 5900 | 70 | 50 | 10 | 25 | 53 | 12 | 100° F., 72 hrs, 3000 psi | 251 | N.D. |
| Sample Composition No. 35 | None | N.A. | N.A. | N.A. | 25 | 57.7 | 11.6 | 195° F., 72 hrs, 3000 psi | 457 | 5480 |
| Sample Composition No. 36 | 6060 | 250 | 60 | 3 | 25.7 | 57.7 | 11.6 | 195° F., 72 hrs, 3000 psi | 540 | 5040 |
| Sample Composition No. 37 | None | N.A. | N.A. | N.A. | 25 | 57.7 | 11.6 | 150° F., 48 hrs, atm. pressure | 224 | 5258 |
| Sample Composition No. 38 | 6060 | 250 | 60 | 3 | 25.7 | 57.7 | 11.6 | 150° F., 48 hrs, atm. pressure | 293 | 4713 |

In Table 6, "N.D." indicates that the tensile strength of a particular sample composition was not determined, and "N.A." indicates that a particular measurement was not applicable.

The above example demonstrates, inter alia, that the cement compositions of the present invention comprising mica may be suitable for use in subterranean formations.

Therefore, the present invention is well adapted to carry out the objects and attain the ends and advantages mentioned as well as those which are inherent therein. While the invention has been depicted and described by reference to certain embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are only, and are not exhaustive of the scope of the invention. Consequently, the invention is intended to be limited only by the spirit and scope of the appended claims, giving full cognizance to equivalents in all respects.

What is claimed is:

1. A method of cementing in a subterranean formation, comprising:
    providing a cement composition comprising water, cement, and a non-fibrous mineral having a mean aspect ratio of at least about 50;
    introducing the cement composition into the subterranean formation; and
    allowing the cement composition to set therein.

2. The method of claim 1, wherein the cement comprises at least one cement selected from the group consisting of: a calcium phosphate cement and a calcium aluminate cement.

3. The method of claim 1, wherein the water is present in an amount in the range of from about 30% to about 180% by weight of the cement.

4. The method of claim 1, wherein the non-fibrous mineral has a layered structure.

5. The method of claim 1, wherein the non-fibrous mineral has a platy structure.

6. The method of claim 1, wherein the non-fibrous mineral comprises at least one non-fibrous mineral selected from the group consisting of: mica, vermiculite, and any mixture thereof.

7. The method of claim 1, wherein the non-fibrous mineral is mica that has a mean aspect ratio in the range of from about 50 to about 250.

8. A method of cementing in a subterranean formation, comprising:
    providing a cement composition comprising water, cement, and a non-fibrous mineral comprising vermiculite having a mean aspect ratio of at least about 50;

introducing the cement composition into the subterranean formation; and allowing the cement composition to set therein.

9. The method of claim 8, wherein the vermiculite has a layered structure.

10. The method of claim 8, wherein the vermiculite has a mean aspect ratio in the range of from about 50 to about 250.

11. The method of claim 8, wherein the cement composition further comprises at least one solid material selected from the group consisting of: wollastonite, basalt, a carbon fiber, a plastic fiber, and any combination thereof.

* * * * *